Dec. 9, 1924.

T. E. MURRAY

MAKING PIPE FITTINGS AND THE LIKE

Filed March 16, 1923      3 Sheets-Sheet 1

1,518,599

Inventor
Thomas E. Murray
By Attorney
D. Anthony Usina

Dec. 9, 1924.
T. E. MURRAY
1,518,599
MAKING PIPE FITTINGS AND THE LIKE
Filed March 16, 1923    3 Sheets-Sheet 2
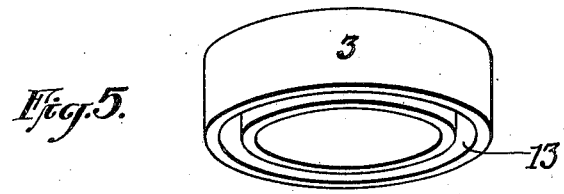
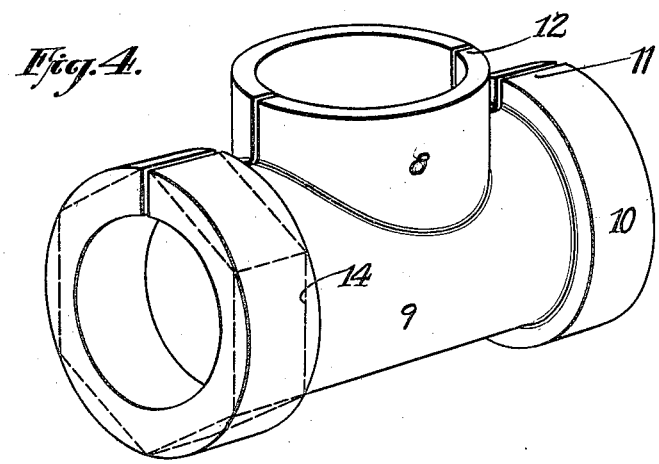
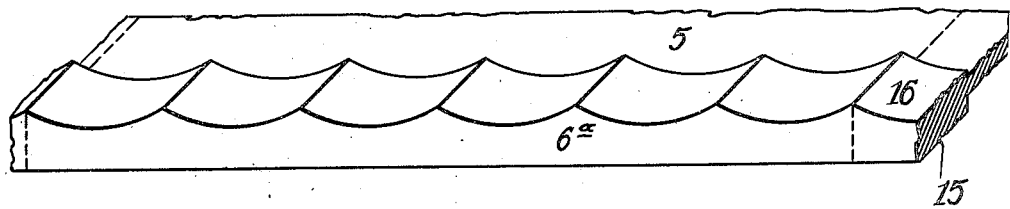
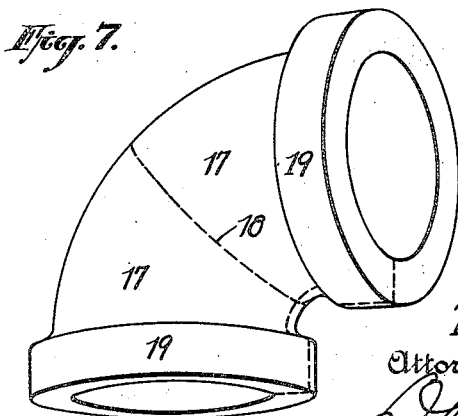
Inventor
Thomas E. Murray.
Attorney Dec. 9, 1924.  
T. E. MURRAY  
1,518,599  
MAKING PIPE FITTINGS AND THE LIKE  
Filed March 16, 1923  
3 Sheets-Sheet 3
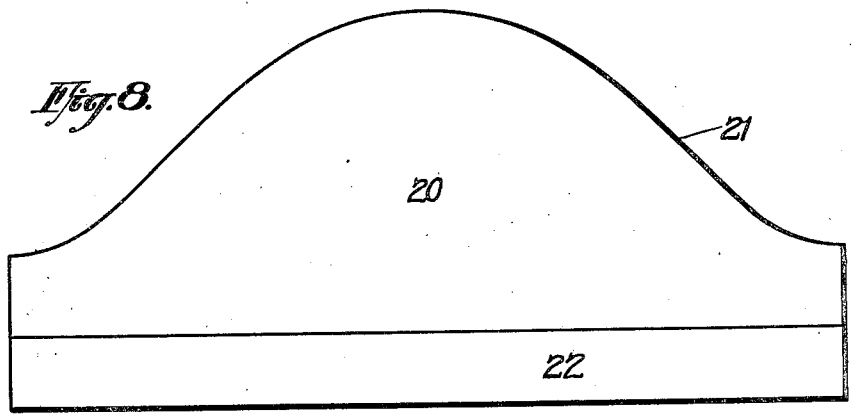
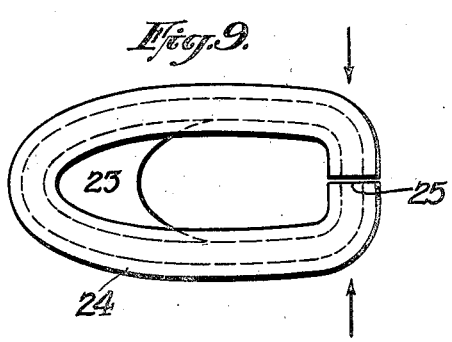
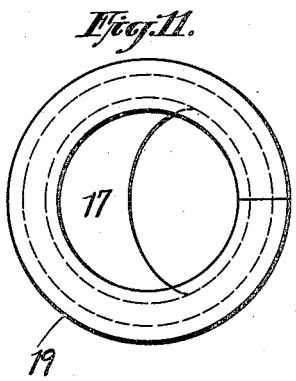
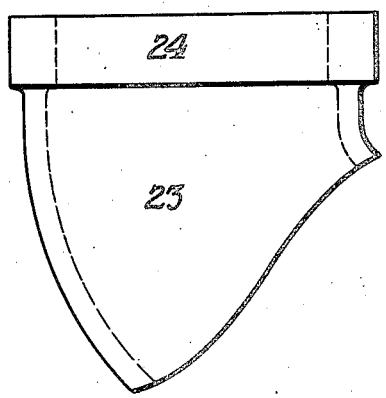
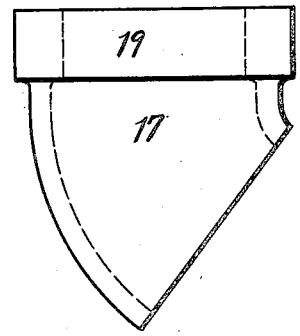
Inventor  
Thomas E. Murray.  
By Attorney Patented Dec. 9, 1924.

1,518,599

UNITED STATES PATENT OFFICE.

THOMAS E. MURRAY, OF BROOKLYN, NEW YORK.

MAKING PIPE FITTINGS AND THE LIKE.

Application filed March 16, 1923. Serial No. 625,481.

*To all whom it may concern:*

Be it known that I, THOMAS E. MURRAY, a citizen of the United States, residing in the borough of Brooklyn, city of New York, county of Kings, and State of New York, have invented certain new and useful Improvements in Making Pipe Fittings and the like, of which the following is a specification.

My invention aims to provide an improved method of making tubular fittings and the like, such for example as T's, elbows and valve bodies from rolled shapes of steel or other metal.

The accompanying drawings illustrate embodiments of the invention.

Figs. 4 and 5 are perspective views of certain parts in an intermediate stage of the process;

Fig. 6 is a segment of a blank;

Fig. 7 is a perspective view of a right angles elbow;

Fig. 8 is a plan of a blank used in producing the same;

Fig. 9 is an end view and Fig. 10 a side view of an intermediate stage in the operation;

Figs. 11 and 12 are respectively an end view and a side view of the next stage.

Figure 1:
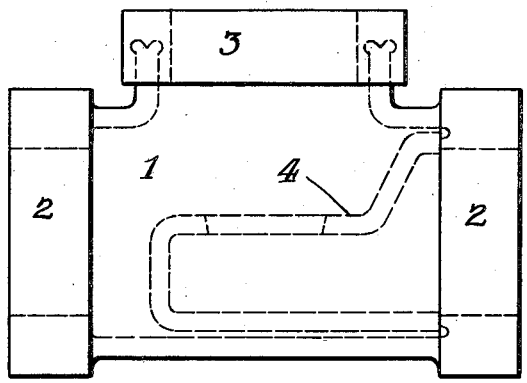
Fig. 1 is a side elevation of a valve body.

Referring to the drawings, the valve body or casing of Fig. 1 comprises the usual T shaped central portion 1 of comparatively thin metal with end flanges 2 on the longitudinal branches which are integral with the central portion and with a flange 3 on the side branch which is welded thereon. I have indicated in Fig. 1 also a diaphragm 4 in dotted lines which may be welded in the casing, the joint being made at the inner end of one of the flanges 2. Various other diaphragms or internal parts may be used.

Figure 2:
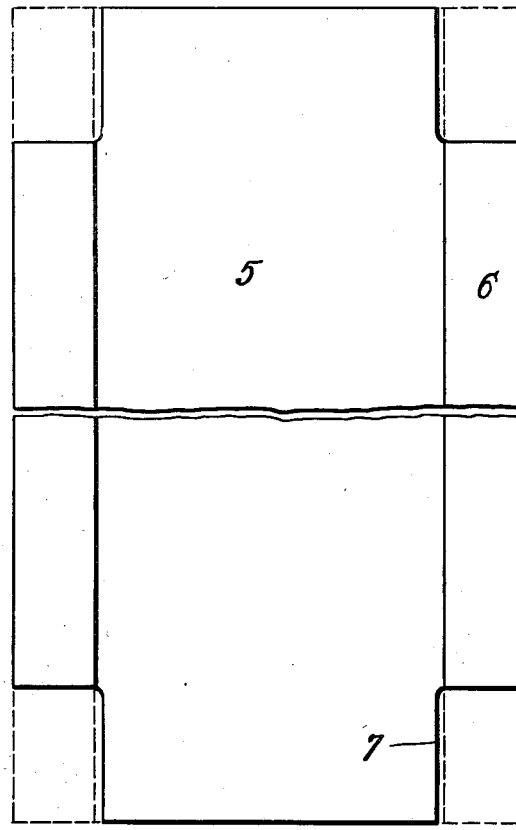
Fig. 2 is a plan, broken away in the middle, of a blank used in making the valve body.
Figure 3:
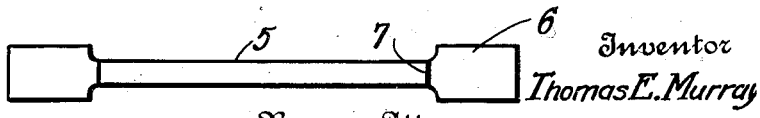
Fig. 3 is an end view of the same.

For such a valve casing the principal parts are made from a rolled strip shown in Fig. 2 with a central thinner portion 5 adapted to form the central portion of the valve casing, minus the flange 3, and with thicker edge portions 6 adapted to form the end flanges 2; the ends of the strip being cut away as indicated at 7 to form portions of reduced width which are to constitute the lateral branch of the casing.

A strip of this shape is bent up in the manner shown in Fig. 4. The narrower end portions are bent around a longitudinal axis to form the segments 8, Fig. 4 of the lateral branch, and the central portion is bent around a transverse axis to form the cylindrical parts 9 and 10 constituting the longitudinal central portion and the end flanges respectively of the valve body. Pressure is then applied from the two opposite sides to bring together the edges indicated at 11 and 12 and a welding current passed so as to form a good electrically welded joint.

The flange 3 is then set over the lateral branch of the body and welded thereto, as described, the end of the branch entering the groove 13 in the flange ring. The product of the foregoing operations is a T with circular flanges. They may subsequently be pressd or otherwise shaped to a polygon such as the hexagon indicated in dotted lines at 14.

Or, the edges of the blank 5 may be so shaped that when the latter is bent up the thickened portions at the side will have a circular interior and a hexagonal exterior. Fig. 6 shows one edge of a bar shaped in this way. The thickened side portion 6ª of the bar has its underface 15 plain and its upper face 16 scalloped in the manner indicated; so that when bent around to the position of Fig. 4 the face 16 will form the hexagon 14. A blank of this shape may be produced by rolling or by combination of rolling and pressing operations.

The elbow of Fig. 7 consists of two forty-five degree portions 17 united by welding on a transverse line 18. Each of the segments 17 has a flange 19 on its end and, with this flange is formed by bending up and welding in a manner similar to that required for producing the T of Fig. 1. The original blank is of the shape of Fig. 8 with a thin portion 20 having an edge 21 of such a shape as to correspond with the joint 18 of the finished T; and having a straight thickened flange 22 along the opposite edge.

It is to be understood that in the operations previously described the welding and the bending of the blank to bring its edges together for welding may, as well as the forming of the blank in the beginning, be accomplished in two or more steps. For the making of the elbow I have illustrated successive stages in the conversion of the blank into the finished segment. According to Figs. 9 and 10 I show the blank bent to an approximately elliptical form, the thinner part 23 and the flange 24 having edges 25 at the end of the longer diameter and bent so as to be substantially parallel; so that they may be easily pressed together by electrodes adjacent to these ends, as indicated by the arrows, and so that the current between the electrodes will flow directly across the edges to be welded instead of by the longer path of electrodes around the closed end of the ellipse. This particular method of shaping and welding is not claimed in the present application, being covered in a previous application for patent.

After the joint is made with the parts in the position of Figs. 9 and 10, the product is put in a press and shaped to the desired section, shown as the circular section indicated in Figs. 11 and 12.

The usual attaching means may be formed or otherwise provided on the edges of the product according to its destined use. The design of flanges illustrated serve to provide the usual hexagon shape, stock for interior threads and reinforcement at the joint. For flanges to be bolted all the extra thickness would generally be arranged on the outside.

Though I have described with great particularity of detail certain embodiments of my invention yet it is not to be understood therefrom that the invention is restricted to the particular embodiments disclosed. Various modifications thereof in detail may be made by those skilled in the art without departure from the invention as defined in the following claims.

What I claim is—

1. The method of making a flanged tubular product which consists in providing a blank of the required thickness of the body of the product with an integral edge of extra thickness and bending the same about an axis transverse to the thick edge.

2. The method of making a flanged tubular product which consists in providing a blank of the required thickness of the body of the product with an integral edge of extra thickness and bending the same about an axis transverse to the thick edge and thus bringing the ends of the blank together, and welding such edges.

3. The method of making a fitting having tubular end portions which are at an angle with each other, with a flange on at least one of said ends, which consists in forming a blank having a thickness corresponding to the body of the desired product and having a thickened edge and bending the same to the desired shape and forming a welded joint at the meeting edges.

In witness whereof, I have hereunto signed my name.

THOMAS E. MURRAY.